United States Patent
Daudi (10) Patent No.: US 6,241,055 B1
(45) Date of Patent: Jun. 5, 2001

(54) ROTOR WITH VISCOELASTIC VIBRATION REDUCING ELEMENT AND METHOD OF MAKING THE SAME

(75) Inventor: Anwar R. Daudi, Ann Arbor, MI (US)

(73) Assignee: Hayes Lemmerz International, Inc., Northville, MI (US)

( * ) Notice: Subject to any disclaimer, the term of this patent is extended or adjusted under 35 U.S.C. 154(b) by 0 days.

(21) Appl. No.: 09/151,341

(22) Filed: Sep. 11, 1998

(51) Int. Cl.[7] ................................................ F16D 65/38
(52) U.S. Cl. ................ 188/73.35; 188/268; 188/218 XL
(58) Field of Search .......................... 188/73.35, 218 XL, 188/73.2, 71.6, 264 A, 264 AA, 218 R, 250 B, 250 G, 264 G, 73.1, 18 A, 73.37, 250 E, 70 R, 58, 59, 268

(56) References Cited

U.S. PATENT DOCUMENTS

| | | |
|---|---|---|
| 2,163,884 | 6/1939 | La Brie . |
| 2,197,232 | 4/1940 | Wood . |
| 3,486,218 | 12/1969 | Buyke . |
| 3,983,973 | 10/1976 | Zboralski et al. . |
| 4,072,219 | 2/1978 | Hahm et al. . |
| 4,177,883 * | 12/1979 | Margetts ........................ 188/218 XL |
| 4,195,713 * | 4/1980 | Hagbjer et al. ...................... 188/268 |
| 4,338,758 * | 7/1982 | Hagbjer ............................ 188/268 X |
| 4,475,634 * | 10/1984 | Flaim et al. .................... 188/218 XL |
| 4,529,079 | 7/1985 | Albertson . |
| 5,107,966 | 4/1992 | Metzler et al. . |
| 5,161,652 | 11/1992 | Suzuki . |
| 5,199,540 | 4/1993 | Fitzpatrick-Ellis et al. . |
| 5,544,726 | 8/1996 | Topouzian et al. . |
| 5,878,843 * | 3/1999 | Saum ............................ 188/218 XL |
| 6,032,769 * | 3/2000 | Daudi ............................ 188/218 XL |

FOREIGN PATENT DOCUMENTS

| | | |
|---|---|---|
| 3831 197 | 1/1990 | (DE) . |
| 85 20 433 | 10/1986 | (GB) . |
| 58072735 | 4/1983 | (JP) . |

OTHER PUBLICATIONS

*Enamels for Engine Structure Damping*, W.D. Brentnall, A.R. Stetson, and A.D.Nashif, Oct. 1983.; Air Force Wright Aeronautical Laboratories Materials Laboratory (AFWAL/MLLN) Wright Patterson Air Force Base, Ohio 45433.

* cited by examiner

*Primary Examiner*—Robert J. Oberleitner
*Assistant Examiner*—Melanie Torres
(74) *Attorney, Agent, or Firm*—Marshall & Melhorn, LLC (57) ABSTRACT

A modular brake rotor includes a core having a central wall and a plurality of support ribs extending radially outwards therefrom. A pair of friction rings are secured to the support ribs. A viscoelastic vibration reducing element is disposed between the support ribs and the friction rings for creating a vibration reducing interface therebetween. The viscoelastic vibration reducing element is preferably a viscoelastic adhesive. In an alternate embodiment, the viscoelastic vibration reducing element is viscoelastic laminate including one or more layers of viscoelastic adhesive bonded to one or more intermediate materials.

11 Claims, 6 Drawing Sheets

ROTOR WITH VISCOELASTIC VIBRATION REDUCING ELEMENT AND METHOD OF MAKING THE SAME

BACKGROUND OF INVENTION

The present invention relates to a vehicle brake rotor and more specifically to a brake rotor having viscoelastic vibration dampening interfaces disposed between the friction rings and ribs.

Wheeled vehicles are typically slowed and stopped with a braking system that generates frictional forces. One known braking system is the disc braking system which includes a rotor attached to one or more of the vehicle wheels for rotation therewith. The rotor has an annular peripheral section comprised of a pair of annular friction rings joined together by spacers or ribs in a mutually parallel, spaced apart relationship to form spaces or vents therebetween. Friction surfaces are disposed on the opposite, outwardly facing annular surfaces of the friction rings.

The disc brake system also includes a caliper assembly secured to a non-rotating component of the vehicle, such as the vehicle frame. The caliper assembly includes a pair of brake pads, each having a backing plate and brake lining material attached thereto. A pad is disposed adjacent each friction ring such that the braking lining material is adjacent the friction surface. The caliper assembly includes at least one moveable piston operatively connected to the backing plate of the brake pads. When the driver brakes the vehicle, hydraulic or pneumatic forces move the piston which clamps the brake lining material of the pads against the friction surfaces of the rotating rotor. As the pads press against the moving rotor friction surfaces, frictional forces are created which oppose the rotation of the wheels and slow the vehicle.

While the conventional rotors function in an effective manner, unwanted noise and vibrations are often generated during braking. A significant portion of the unwanted noise and vibration is generated at the interface of the brake pads and rotor friction surfaces. Vibrations generated at these interfaces excite the rotors creating noise which is transmitted to the occupants of the vehicle. This problem is compounded by the increased use of metallic and semi-metallic brake lining materials which produce more noise and vibration than previously used lining materials.

It is known to apply damping material to the brake backing plate to reduce transmission of the noise and vibration through the backing plate thereby quieting the braking noise. However, the dampened backing plate does not adequately quiet the disc braking system, because it does not adequately reduce the noise and vibration at the friction rings. It is desirable to reduce the noise and vibration created at the friction rings and thus further quiet the disc braking system.

SUMMARY OF INVENTION

The invention relates to an improved modular brake rotor and method for producing the same. The modular brake rotor includes a core having a central hat wall and a plurality of support ribs extending radially outwards therefrom. A pair of friction rings are secured to the support ribs. A viscoelastic vibration reducing element is disposed between the support ribs and the friction rings for creating a vibration reducing interface therebetween. The viscoelastic vibration reducing element includes both viscous and elastic properties and has a greater tendency for reducing the transmission of vibrations therethrough relative to the material forming the friction rings. The viscoelastic vibration reducing element is preferably a viscoelastic adhesive. In an alternate embodiment, the viscoelastic vibration reducing element is a viscoelastic laminate including one or more layers of viscoelastic adhesive bonded to one or more intermediate materials. The viscoelastic adhesive may be a silicone adhesive, an enamel, or any other suitable adhesive with both viscous and elastic properties having a greater tendency for reducing the transmission of vibrations therethrough relative to the material forming the friction rings.

The method for producing the modular disc brake rotor comprises the steps of forming a rotor core including a hat section and ribs extending from the hat section, forming annular friction rings, and securing the friction rings to the rotor core with a viscoelastic vibration reducing element to create a vibration reducing interface therebetween. The viscoelastic vibration reducing element is a preferably a viscoelastic adhesive, or a viscoelastic laminate having a viscoelastic adhesive bonded to an intermediate material.

BRIEF DESCRIPTION OF THE DRAWINGS

The advantages of the invention will become readily apparent to those skilled in the art from the following detailed description of a preferred embodiment when considered in the light of the accompanying drawings, in which.

DETAILED DESCRIPTION OF THE PREFERRED EMBODIMENT

Figure 1:
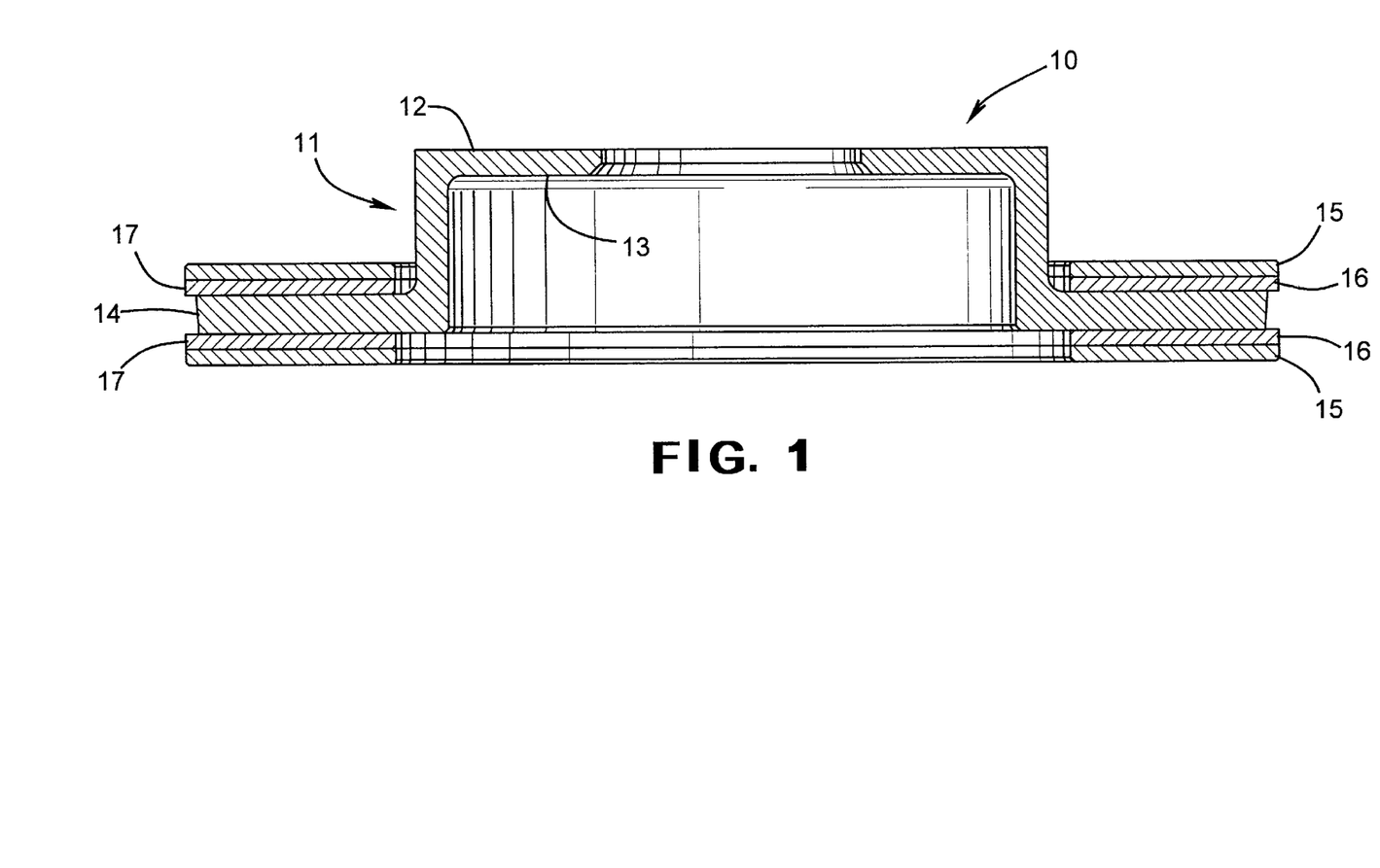
FIG. 1 is a sectional elevational view of a rotor having an enlarged view of a viscoelastic vibration reducing element comprising a viscoelastic adhesive in accordance with the invention.

Referring now to the drawings, there is illustrated in FIG. 1 a rotor embodying the present invention and designated generally with the reference numeral 10. The rotor 10 is of the type adapted for use in conjunction with a variety of mechanical devices, especially disc brake braking systems and the like.

The rotor 10 includes a core 11 having a centrally disposed hat section 12 with a mounting face 13 for mounting the rotor 10 on an associated drive member (not shown), such as a spindle or vehicle axle. The core 11 also includes a peripheral section 14 extending radially outwards from the hat section 12. The peripheral section 14 preferably includes a plurality of spaced apart ribs (not shown), although it may be a flat annular ring. A pair annular friction rings 15 are secured to the peripheral section 14 of the core 11 in any suitable manner, examples of which are described below. Brake pads (not shown) are adapted to press against the friction rings for braking the vehicle as described above. The rotor may optionally include cooling vents (not shown).

A viscoelastic vibration reducing element 16 is disposed between the core 11 and one or both of the friction rings 15. The viscoelastic vibration reducing element 16 is preferably a viscoelastic adhesive 17. A viscoelastic adhesive is defined as any adhesive having viscous properties and elastic properties and has a greater tendency for reducing the transmission of vibrations therethrough relative to the material forming the friction rings. A viscoelastic adhesive will typically yield continually under stress. The viscoelastic adhesive is preferably a silicone adhesive, although any suitable viscoelastic adhesive including enamels, such as vitreous enamels may be used.

The viscoelastic vibration reducing adhesive 17 reduces braking noise by dampening the vibrations of the friction rings 15 when they are excited by the brake pads (not shown) during braking. The vibrations are dampened by converting vibrational energy into heat. This conversion occurs either by the mechanical extension and contraction of the material, or by shear within the material. The viscoelastic adhesive 17 dampens the vibrations of the friction rings when they are excited by the brake pads during braking as described above. The dampened friction rings vibrate less than undamped ones, thereby creating less objectionable noise.

In addition, the viscoelastic adhesive 17 forms a vibration reducing interface between the friction rings 15 and the core 11. Typical rotors without the viscoelastic vibration reducing element provide a less impeded path for the transmission of vibrational energy from the friction rings to the rest of the rotor. When the friction rings of these rotors are excited during braking, the vibrations move to the rest of the rotor causing it to resonate and produce undesirable noise. Some of the vibrations move from the rotor core through the vehicle creating undesirable noise and vibration for the occupants inside the vehicle. The viscoelastic adhesive 17 blocks the transmission of at least a portion of the vibrational energy between the friction rings and the rest of the rotor, thereby reducing the transmission of these vibrations to the occupants.

Figures 2, 4:
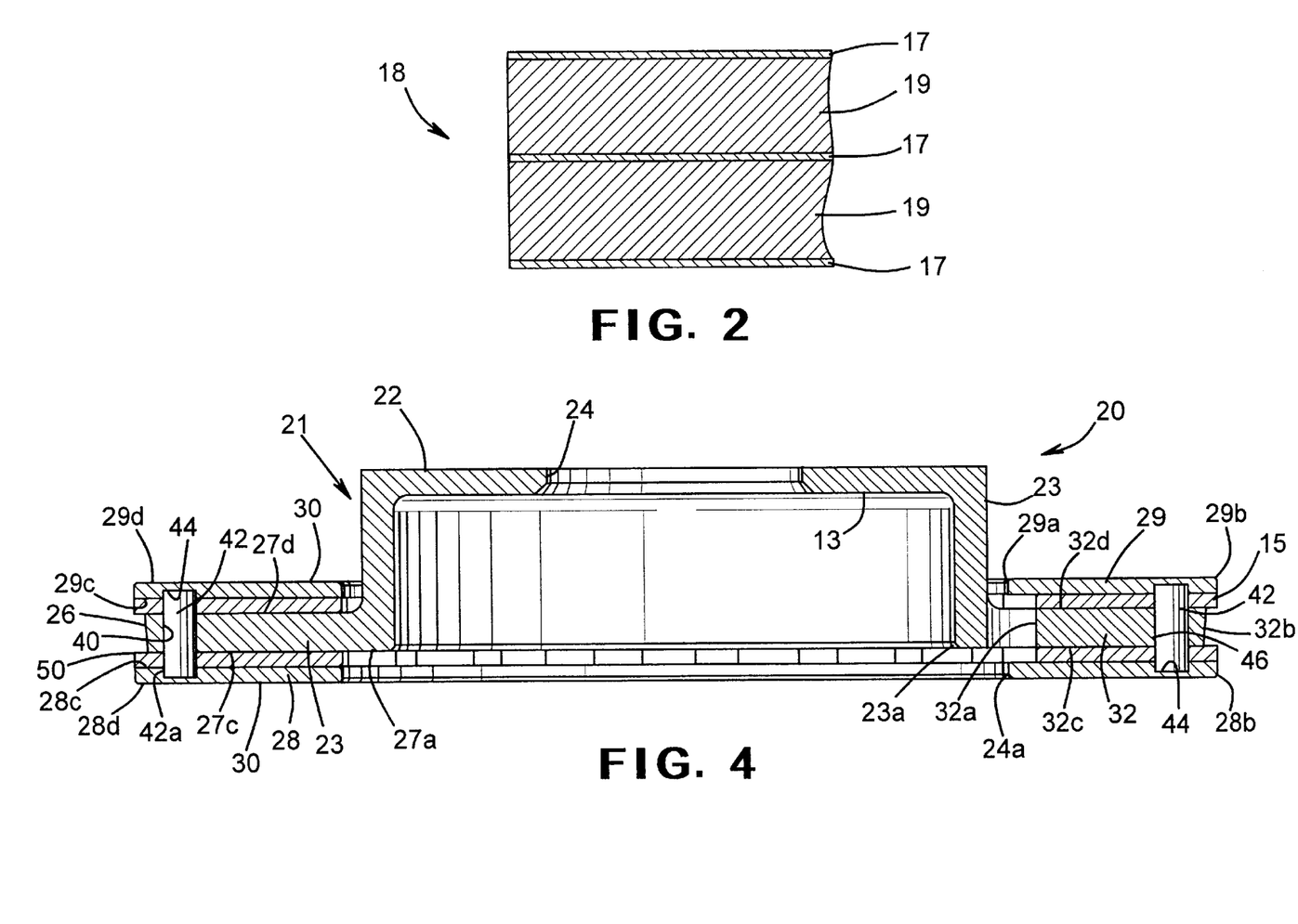
FIG. 2 is an enlarged sectional view of an alternate embodiment of the viscoelastic vibration reducing element comprising a viscoelastic laminate in accordance with the invention.
FIG. 4 is a sectional elevational view of an alternate embodiment of the rotor illustrated in FIG. 1.

Referring now to FIG. 2, an alternate embodiment of the viscoelastic vibration reducing element 16 is shown as a viscoelastic laminate illustrated generally at 18. The viscoelastic laminate 18 includes layers of the viscoelastic adhesive 17 described above, alternating with layers of intermediate laminate material 19. The intermediate laminate material 19 is preferably metal such as steel, however any other metal including aluminum, metal alloys, or composites such as aluminum MMC may be used. Alternatively, the intermediate laminate material 19 may be a fiber reinforced material, such as fiber reinforced plastic.

The viscoelastic laminate 18 is disposed between the core 11 and the friction rings 28, 29 for dampening vibrations and reducing their transmission from the friction rings to the rest of the rotor 10. While it is preferable that the viscoelastic laminate 18 be secured to the friction rings 28, 29 and the core 11 with the viscoelastic adhesive 17, other suitable means of securing such as mechanical fasteners including rivets, bolts or any other known fasteners, or staking may be used. Although two layers of intermediate laminate material 19 and three layers of adhesive 17 are illustrated in FIG. 2, any number of layers of intermediate laminate material and viscoelastic adhesives may be used. As described above, any suitable viscoelastic adhesive may also be used.

Furthermore, since different viscoelastic adhesives provide optimum sound dampening at different temperature ranges, several different viscoelastic adhesives may be used in different layers to provide optimum sound dampening over a broader range of temperatures than just a single adhesive. Finally, several viscoelastic adhesives may be combined with several intermediate laminate materials.

The method of manufacturing a rotor having a viscoelastic vibration reducing element shall now be described. A rotor core 11 is formed using any suitable technique such as casting. The core is preferably formed as a one-piece unit as described above including a hat section and a peripheral section. The friction rings are formed from any suitable technique including casting or stamping. The viscoelastic vibration reducing element is placed between the peripheral section and the friction rings, and then the friction rings are secured to the core. The rotor may then be finish machined to the desired dimensions.

Specific examples of rotors having a viscoelastic vibration reducing element disposed between the friction rings and the core are described in detail in the following specification and illustrated in the attached drawings, however, it is to be understood these examples are simply exemplary embodiments of the inventive concepts defined in the appended claims. Hence, specific structural details, dimensions and other physical characteristics relating to these embodiments should not be considered as limiting, unless the claims expressly state otherwise.

Figure 3:
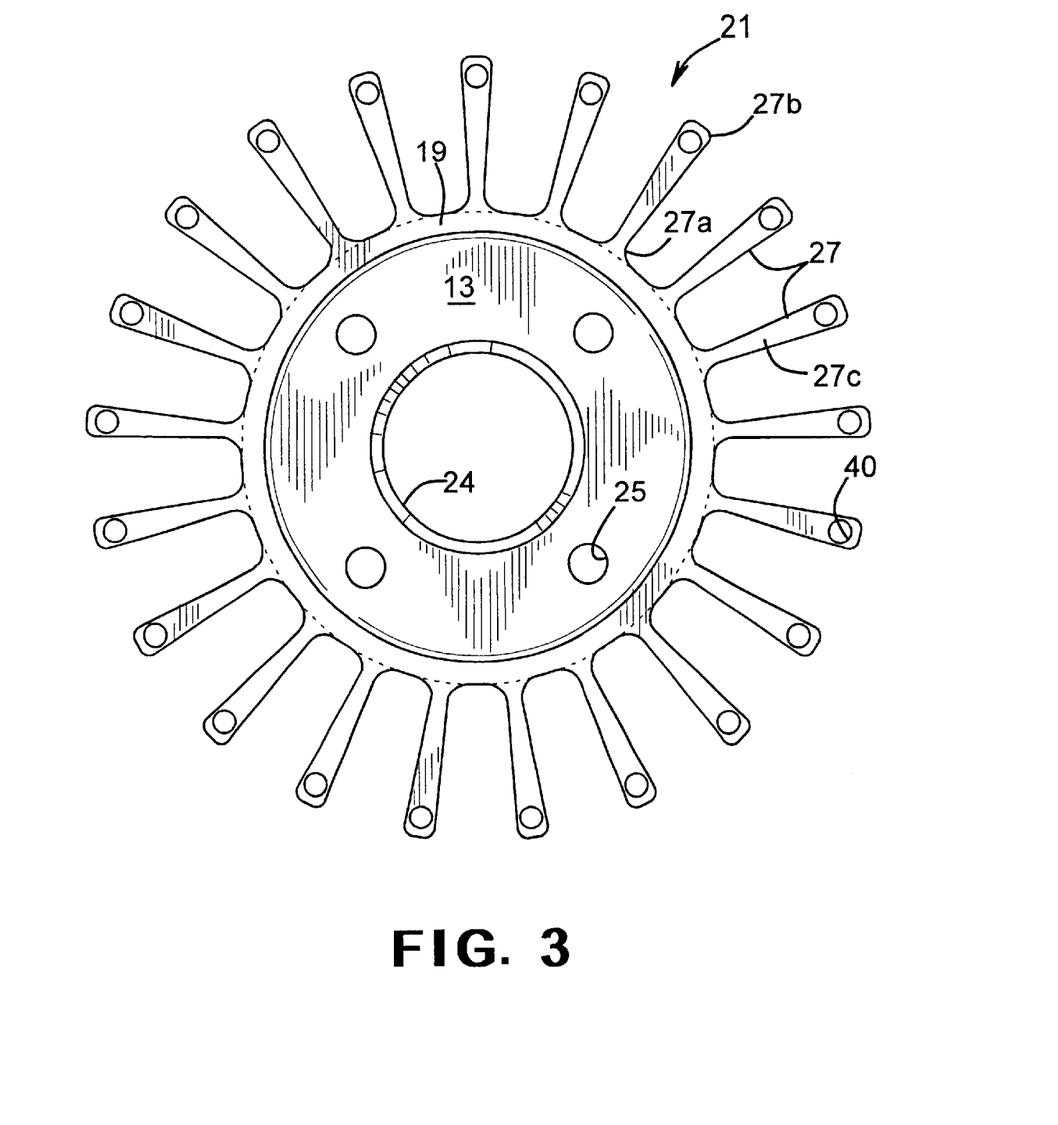
FIG. 3 is a plat view of the rotor core in accordance with the invention.

Referring now to FIGS. 3, and 4, an alternate embodiment of the rotor is shown generally at 20. The rotor includes a core 21 consisting of a hat section 22 having a central mounting face 13 for mounting the rotor 20 on an associated drive member (not shown), such as a spindle or vehicle axle. The hat section 22 also includes a generally cylindrical shoulder or hat wall 23 extending from the periphery of the mounting face 13 and terminating at an inboard edge 23a. Alternatively, the hat wall 23 may be inclined, forming a portion of a cone.

The central mounting face 13 of the hat section 22 of rotor 20 is provided with a central pilot aperture 24 in which a spindle hub or the like (not shown) may be closely received, and a plurality of circumferentially spaced apart fastener apertures 25 in which fasteners (also not shown) may be received to mount the rotor 20 on an associated drive mechanism in the conventional manner.

The core 11 also includes a peripheral section 26 including a plurality of circumferentially spaced apart support ribs 27 interconnected at their radially inner ends 27a with the radially outer surface of the hat wall 23 proximate the inboard edge 23a thereof. The support ribs 27 preferably extend straight, radially outwards from the hat wall 23, terminating in radially outer ends 27b.

Alternatively, the ribs 27 may be curved, extending away from the hat wall 23 at angles with respect to radius of the hat section 22. The support ribs 27 preferably are all similarly shaped, each having a flat inboard mounting surface 27c and a flat outboard mounting surface 27d. The inboard and outboard mounting surfaces 27c and 27d are preferably mutually parallel and together define a support rib thickness which is preferably constant from the radially inner ends 27a to the radially outer ends 27b. The flat inboard mounting surfaces 27c of all of the support ribs are coplanar, as is the flat outboard mounting surfaces 27d. Alternatively, the support ribs 27 may have different shapes, or may not have a constant thickness.

The core 11 is preferably an integral or one-piece unit, with the support ribs 27 formed integrally with the hat section. The core 11 is formed of any suitable material such as, for example, cast grey iron, aluminum, or alloys or composites of either including aluminum MMC and the like.

Figure 5:
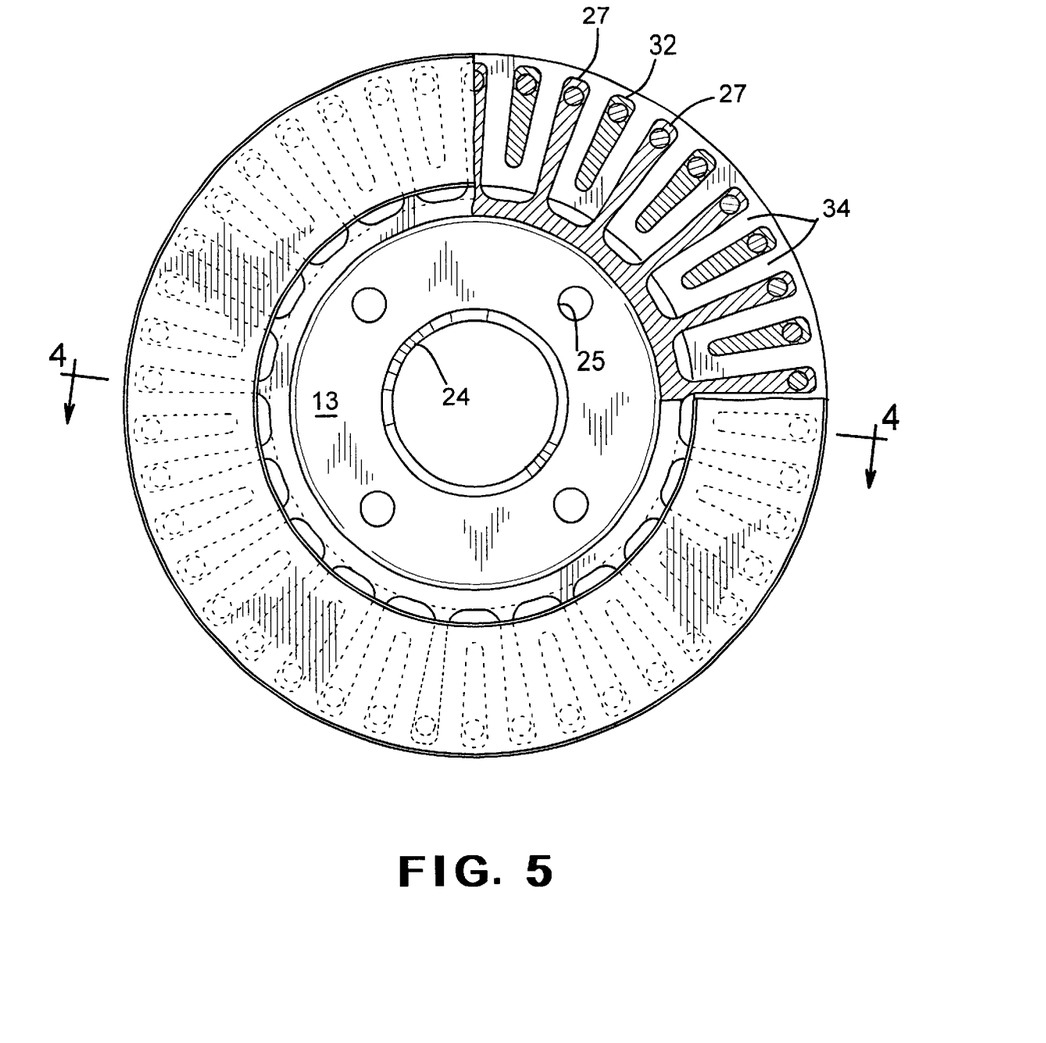
FIG. 5 is a partial sectional plan view of the rotor illustrated in FIG. 4.

Referring now to FIGS. 4 and 5, a pair of annular friction rings, including an inboard friction ring 28 and outboard friction ring 29, are secured to the core 11 by attachment to the support ribs 27 as described in detail below. The friction rings 28, 29 are secured to the support rib inboard and outboard mounting surfaces, 27c and 27d respectively, in a mutually parallel, spaced apart relationship. The annular friction rings 28, 29 have radially inner edges 28a and 29a which define the inner diameters of the friction rings, and radially outer edges 28b and 29b which define the outer diameters of the friction rings. The support ribs 27 fixedly interconnect the friction rings 28 and 29 with the hat section 22 of the rotor 10, in a manner such that the entire inner edges 28a, 29a of both of the friction rings 28 and 29 are spaced apart, radially outwards from the outer diameter of the hat wall 23.

The friction rings 28, 29 also have generally flat, inwardly facing sides 28c and 29c which face each other, and generally flat outwardly facing sides 28d, 29d. Flat annular friction surfaces 30 are located on the outwardly facing sides 28d, 29d of the friction rings 28 and 29. The friction surfaces 30 are adapted to interface with associated friction members (not shown), such as brake pads or the like.

A plurality of circumferentially spaced apart secondary ribs 32 are provided to also fixedly interconnect the inboard friction ring 28 with the outboard friction ring 29.

The secondary ribs 32, however, are spaced apart in the radial direction from the outer diameter of the hat wall 23.

The radially inner ends 32a of the secondary ribs 32 preferably do not extend radially inward beyond the inner 5 edges 28a, 29a of the friction rings 28 and 29. The radially outer ends 32b of the secondary ribs preferably do not extend beyond the outer edges 28b, 29b of the friction rings 28, 29.

The secondary ribs 32 preferably are all similarly shaped, each having a flat inboard mounting surface 32c and a flat outboard mounting surface 32d. The inboard and outboard mounting surfaces 32c and 32d are preferably mutually parallel and together define a secondary rib thickness which is preferably constant from the radially inner ends 32a to the radially outer ends 32b, although alternatively this thickness may vary. The secondary ribs 32 have the same thickness as the support ribs 27.

The support ribs 27 and the secondary ribs 32 are arranged between the friction rings 28 and 29 with the secondary ribs 27 interspersed between the support ribs 32.

In the illustrated embodiment, which is preferred, the support ribs 27 and secondary ribs 32 are arranged in an alternating fashion.

Radially extending spaces or radial vents 34 are defined between the inwardly facing sides 28c and 29c of the friction rings 28, 29 and the support and secondary ribs 27, 32. The radial vents 34 are open at the inner edges 28a, 29a and the outer edges 28b, 29b of the friction rings 28, 29 to form air passages therebetween. As the rotor turns, air typically flows radially outwardly through the vents. Each vent 34 can receive air flowing from the inboard side of the rotor 10 between the hat wall 23 and the inner edge 28a of the inboard friction ring 28, as well as air flowing from the outboard side of the rotor 10 between the hat wall 23 and the inner edge 29a of the outboard friction ring 29. The inboard and outboard flow path enables a large quantity of air to flow through the vents 34 providing maximum cooling effectiveness.

The support ribs 27 and the secondary ribs 32 are both preferably tapered to enhance the air flow through the vents 34. The tapered ribs 27, 32 have wider radially outer ends 27b, 32b and narrower radially inner ends 27a, 32a when viewed from the inboard or outboard mounting surfaces (as seen in FIG. 3). The ribs 27, 32 are tapered so that the cross sectional area of the radial vents 34, defined between the ribs 27, 32 and the friction ring inner surfaces 28c, 29c, remains approximately constant from the inner ends to the outer ends of the secondary ribs 32. The constant cross sectional area of the vents 34 reduces pressure differentials between the radially inner and radially outer ends of the vents which may impede the flow of air through the vents. However, the shape, size and location of the ribs 27 and 32 can be varied to achieve the desired air flow characteristics.

The friction rings 28 and 29 are secured to the support ribs 27 using a mechanical connection, preferably including a combination of dowels and adhesives. The support ribs 27 include a hole 40 extending from the inboard mounting surfaces 27c to the outboard mounting surfaces 27d. The hole 40 is preferably located near the radially outer end 27b of the support ribs 27, although it may be located in any suitable location.

Dowels 42 are disposed in each of the holes 40 and extending through the support ribs 27. The dowels 42 form protrusions 42a which extend out of the inboard and outboard mounting surfaces 27c and 27d and into recesses 44 formed in the friction ring inner surfaces 28c and 29c. The recesses 44 do not extend completely through the friction rings to the outer surfaces 28d and 29d thereof. The dowels 42 are preferably cylindrical having a radius equal to the radius of the holes 40 and recesses 44 to provide a friction fit therebetween which securely retains them within the ribs 27. The friction fit between the dowels 42 and the recesses 44 securely retains the friction rings 28, 29 to the support ribs 27 and thus to the hat section 22. Alternatively, the holes 40, the recesses 44 and the dowels 42 may have any suitable shape necessary to provide a friction fit therebetween capable of securing the friction rings 28, 29 to the support ribs 27. Additionally, optional fasteners such as set screws (not shown) may be used to secure the dowels 42 to the ribs 27.

The friction rings 28 and 29 are secured to the secondary ribs 32 in a similar manner as the support ribs 27. The secondary ribs 32 include a hole 46 extending therethrough similar to the support rib holes 40. Dowels 42 are disposed in each of the holes 46 and extend into recesses 44 formed in the friction rings as described above.

According to the invention, a viscoelastic vibration reducing element 16 is disposed between the ribs 27, 32 and the friction rings 28, 29. The viscoelastic vibration reducing element is preferably a viscoelastic adhesive 17, as described above. Alternatively, the viscoelastic vibration reducing element may be a laminate 18 as described above. The viscoelastic adhesive 17 may be used in conjunction with mechanical fasteners to secure the friction rings 28, 29 to the ribs 27, 32.

The method of producing the rotor disclosed above shall now be discussed. The core 21 is cast using any suitable known method, to includes a flat annular disc (not shown) extending radially from the hat wall 23 proximate the inboard edge 23a. The disk preferably has flat inboard and outboard surfaces. The disk is then machined to form the individual support ribs 27 using shearing, wire EDM, or any other suitable machining or milling operation.

Alternatively, the core 21 is cast with the individual support ribs 27 extending from the hat wall 23 of the hat section 22. The individual support ribs 27 preferably are cast with flat inboard and outboard mounting surfaces, although the ribs may be machined to the desired dimensions after casting.

The friction rings 28 and 29 are preferably cast using any suitable known casting method. The friction rings may be machined after casting to achieve the desired dimensions. Alternatively, the friction rings 28, 29 may be formed of steel using any suitable method such as stamping. The friction rings 28 and 29 are then secured to the support ribs 28 of the core 21 using a mechanical connection preferably including a combination of dowels and adhesives.

The dowel holes 40 are machined in the support ribs 27 by any suitable known machining operation. The holes may alternatively, be cast into the support ribs 27 and then finish machined by any known manner. The finished holes 40 have a predetermined diameter. Dowels 42 having a diameter equal to or slightly larger than the diameters of the holes 40 are press fit into each of the holes 40 such that the ends of the dowels extend a predetermined distance out of the inboard and outboard mounting surfaces 27c and 27d. The press fit securely retains the dowels 42 within the support ribs 27.

The secondary ribs 32 are formed by any known manner such as casting or machining. A hole 40 is formed through each secondary rib 32 in a similar manner as the support ribs 27. The dowels 42 are also press fit into each of the secondary rib holes 40 in a similar manner as the support ribs 27. The dowels 42 are preferably cylindrical having a radius equal to or slightly larger than the holes 40 to provide a friction fit which securely retains them within the ribs 27 and 32. Additional, optional fasteners such as set screws (not shown) may be used to secure the dowels 42 to the ribs 27, 32.

Recesses 44 are formed in the friction ring inner surfaces 28c and 29c so as to align with the dowels 42. The recesses 44 are positioned to correspond with the location of the holes 40 in the ribs 27 and 32.

The viscoelastic vibration reducing element 16 is placed between the friction ring inner surfaces 28c, 29c and the mounting surfaces of the ribs 27, 32 as described above. The friction rings 28, 29 are then pressed against the inboard and outboard mounting surfaces of the ribs in a manner which causes the dowels 42 to be pressed into the recesses thereby securing the friction rings to the support ribs. The friction rings 28, 29 are further pressed until the adhesive is pressed between the friction rings 28, 29 and the ribs 27, 32. The viscoelastic adhesive 16 is allowed to dry or cure until the friction rings 28, 29 are securely bonded to the ribs 27, 32. The friction rings 28, 29 of the rotor 10 may then be finish machined to produce flat friction surfaces 30 thereon.

Figure 6:
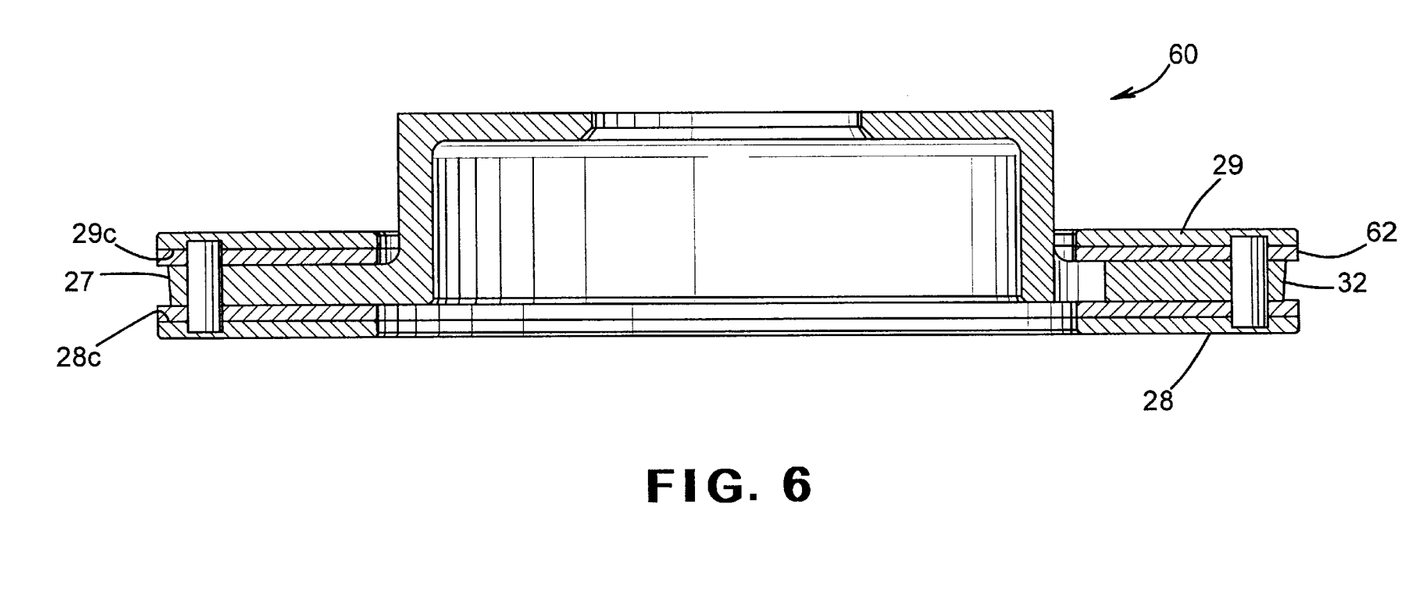
FIG. 6 is a sectional elevational view of a second alternate embodiment of the rotor having a viscoelastic vibration reducing element in accordance with the invention.

Referring now to FIG. 6, an alternate embodiment of the rotor is illustrated at 60. The rotor 60 is similar to the rotor 20 described above with similar components labled with like reference numerals. A viscoelastic vibration reducing element in the form of a laminate 62, similar to the laminate 18 described above, is used between the ribs 27, 32 and the friction rings 28, 29. The laminate 62 is annular, and is disposed around the entire friction ring inner surfaces 28c, 29c. The laminate 62 includes a viscoelastic adhesive on each side which bonds the friction rings 28, 29 to the ribs 27, 32 as described above.

Figure 7:
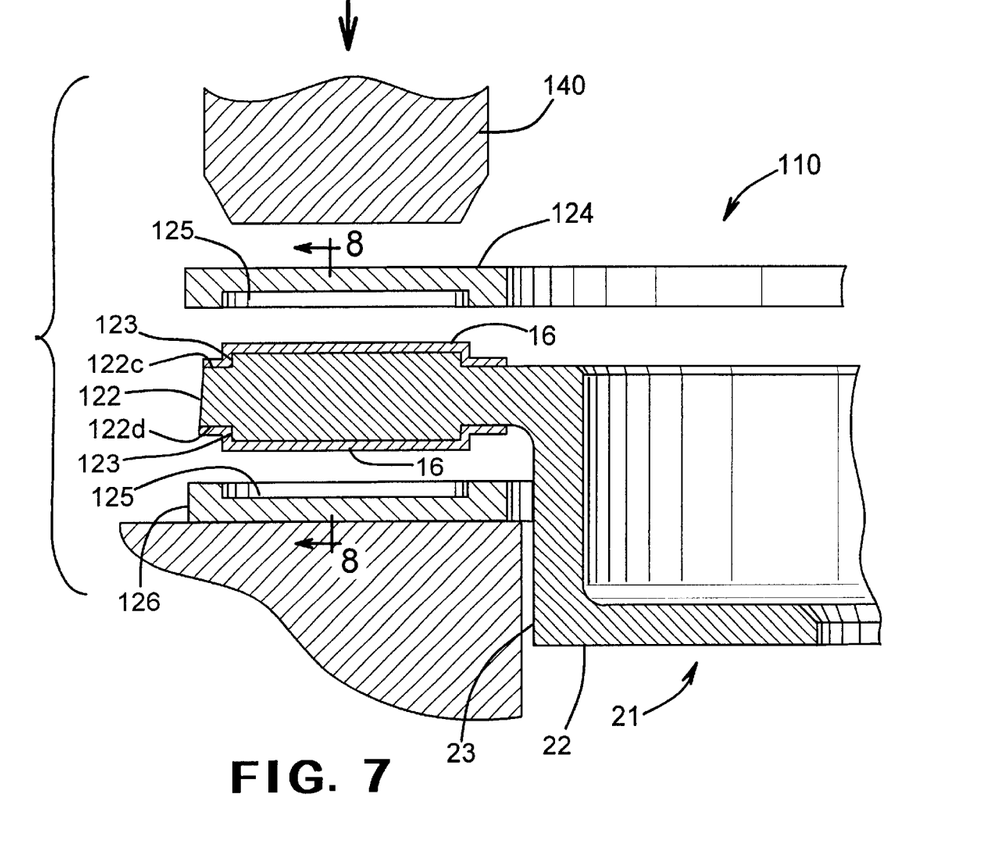
FIG. 7 is a sectional elevational view of a third alternate embodiment of the rotor having a viscoelastic vibration reducing element in accordance with the invention.
Figure 8:
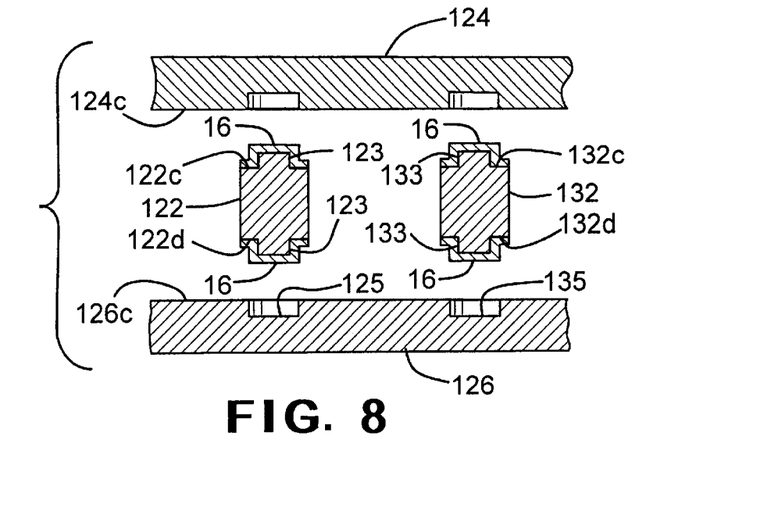
FIG. 8 is a sectional elevational view taken along lines 8—8 in FIG. 7.

Referring now to FIGS. 7 and 8, an alternate embodiment of a modular rotor having a viscoelastic vibration reducing element shown generally at 110 is illustrated. The modular rotor 110 is similar to the rotor 20 described above. The modular rotor 110 includes a core 21 having a hat section 22 and integral support ribs 122 extending from the hat wall 23 as described above. The support ribs 122 are similar to the support ribs 27 described above and include a flat inboard mounting surface 122c and a flat outboard mounting surface 122d. The support ribs 122 further include protrusions 123 extending outwardly from the mounting surfaces 122c and 122d. The protrusions 123 are preferably formed integrally with the support ribs 122, though alternatively, separate protrusions may be secured to the support ribs 122 in a known manner.

The rotor 110 further includes a pair of annular friction rings, including an inboard friction ring 124 and outboard friction ring 126. The friction rings 124, 126 are secured to the support rib inboard and outboard mounting surfaces, 122c and 122d respectively in a manner describe below. The friction rings 124, 126 are spaced radially outwards from the hat section and disposed in a mutually parallel, spaced apart relationship similar to the friction rings 28, 29 described above.

The annular friction rings 124, 126 further include support rib recesses 125 formed on the flat inwardly facing sides 124c and 126c. The shape and position of the support rib recesses 125 correspond to the shape and position of the support rib protrusions 123, so that the protrusions are received in the recesses when the rotor 110 is assembled as described below. The recesses may be formed in only one of the inwardly facing sides. Alternatively, the support ribs may or may not include protrusions, the recesses 125 are shaped to correspond to the shape of the support ribs, and the support ribs extend into the recesses 125 when the rotor 110 is assembled.

A plurality of circumferentially spaced apart secondary ribs 132 are provided to also fixedly interconnect the inboard friction ring 124 with the outboard friction ring 126. The secondary ribs 132 are disposed between the support ribs 122 and spaced apart from the hat section in a similar manner as the support ribs 32 described above.

The secondary ribs 132 include protrusions 133 extending outwardly from the mounting surfaces 132c and 132d, similar to the support rib protrusions 123. The protrusions 133 are preferably formed integrally with the secondary ribs 132, though alternatively, separate protrusions may be secured to the secondary ribs 132 in a known manner. The protrusions 133 are received into secondary rib recesses 135 formed on the flat inwardly facing sides 124c and 126c of the friction rings 124 and 126 respectively. The shape and position of the secondary rib recesses 135 correspond to the shape and position of the secondary rib protrusions 133, so that the protrusions are received in the recesses when the rotor 110 is assembled. Alternatively, the secondary ribs 135 may or may not include protrusions, the secondary rib recesses 135 are shaped to correspond to the shape of the secondary ribs, and the secondary ribs extend into the recesses 135 when the rotor 110 is assembled.

A viscoelastic vibration reducing element 16 is disposed between the friction ring inner surfaces 124c, 126c and the mounting surfaces of the ribs 122, 132 as described above. The viscoelastic vibration reducing element may be in form of an adhesive 17 as described above, or a laminate 18 as described above.

The method of producing the rotor 110 shall now be discussed. The core 21 is cast using any suitable known method with the individual support ribs 122 formed during the casting and extending from the hat wall 23 of the hat section 22. The individual support ribs 122 are preferably cast with the protrusions 123 extending from flat inboard and outboard mounting surfaces 122d and 122d. Alternatively the ribs 122 may be machined to the desired dimensions after casting to form the protrusions 123.

Alternatively, the core 21 is cast to include a flat annular disc (not shown) extending radially from the hat wall 23 proximate the inboard edge 23a. The disk preferably has flat inboard and outboard surfaces. The disk is then machined to form the individual support ribs 122 having the protrusions 123, using shearing, wire EDM, or any other suitable machining or milling operation. The secondary ribs 132 are formed by any know manner such as casting or machining to include the protrusions 133 extending from the mounting surfaces 132c and 132d mentioned above.

The friction rings 124 and 126 are preferably cast using any suitable known casting method. The friction rings 124 and 126 are preferably cast having the support rib recesses 125 and secondary rib recesses 135 formed in the inwardly facing sides 124c and 126c. The recesses 125, 135 may be machined after casting to achieve the desired dimensions. Alternatively, the friction rings 124, 126 may be formed of steel using any suitable method such as stamping and the recesses formed using known machining methods.

The viscoelastic vibration reducing element 16 is placed between the friction ring inner surfaces 124c, 126c and the mounting surfaces of the ribs 122, 132 as described above. The viscoelastic vibration reducing element may be in form of an adhesive 17 as described above, or a laminate 18 as described above.

The friction rings 124 and 126 are then secured to the support ribs 122 of the core 21 preferably using staking. The friction rings 124 and 126 are disposed adjacent the support ribs 122 and secondary ribs 132 such that the support rib protrusions 123 are aligned with the support rib recesses 125 and the secondary rib protrusions 133 are aligned with the secondary rib recesses 135. The friction rings 124, 126 are then staked to the ribs 122, 132 by pressing the friction rings together using a press 140 or other known device. Staking the friction rings to the ribs creates a metal to metal bond between the ribs and friction rings which secures the friction rings to the ribs.

The protrusions 123 may also form a friction fit with the recesses 125 to secure the friction rings to the ribs 122 and 132 in a manner similar to the dowels 40 described above. The friction fit may augment the staking for strengthening the attachment of the friction rings to the ribs. Alternatively, the friction fit may be used in place of the staking.

In accordance with the provisions of the patent statutes, the principles and mode of operation of this invention have been described and illustrated in its preferred embodiment. However, it must be understood that the invention may be practiced otherwise than specifically explained and illustrated without departing from its spirit or scope.

What is claimed is:

1. A brake rotor comprising:

a core having a hat section and a plurality of support ribs extending therefrom;

a pair of friction rings secured to said support ribs;

a viscoelastic vibration reducing element disposed between said support ribs and said friction rings, wherein said viscoelastic vibration reducing element is a laminate comprising a viscoelastic adhesive and an intermediate material bonded to said viscoelastic adhesive.

2. The brake rotor defined in claim 1 wherein said viscoelastic adhesive is a silicone adhesive.

3. The brake rotor defined in claim 1 wherein said viscoelastic adhesive is an enamel adhesive.

4. The brake rotor defined in claim 1 wherein said intermediate material is metal.

5. The brake rotor defined in claim 4 wherein said intermediate material is steel.

6. The brake rotor defined in claim 4 wherein said intermediate material is aluminum.

7. The brake rotor defined in claim 1 wherein said intermediate material is a fiber reinforced material.

8. A method of manufacturing a brake rotor including the steps of:

(a) forming a rotor core including a hat section and ribs extending from said hat section;

(b) forming annular friction rings; and (c) securing said friction rings to said rotor core with a viscoelastic vibration reducing element to create a vibration reducing interface therebetween, wherein the viscoelastic vibration reducing element is a viscoelastic laminate having a viscoelastic adhesive bonded to an intermediate material.

9. A method of manufacturing a brake rotor comprising forming a rotor core including a hat section and ribs extending from said hat section; forming annular friction rings; providing viscolelastic vibration reducing elements; placing the viscoelastic vibration reducing elements adjacent the ribs; and securing the friction rings to the ribs and the viscoelastic vibration reducing elements to create a vibration reducing interface between the ribs and the friction rings wherein the viscoelastic vibration reducing element is a viscoelastic laminate having a viscoelastic adhesive bonded to an intermediate material.

10. The method defined in claim 9 wherein the intermediate material is metal.

11. The method defined in claim 9 wherein the intermediate material is a fiber reinforced material.

* * * * *